United States Patent
Fetvedt et al.

(10) Patent No.: US 11,572,828 B2
(45) Date of Patent: Feb. 7, 2023

(54) SYSTEMS AND METHODS FOR POWER GENERATION WITH FLAMELESS COMBUSTION

(71) Applicant: 8 Rivers Capital, LLC, Durham, NC (US)

(72) Inventors: Jeremy Eron Fetvedt, Raleigh, NC (US); Brock Alan Forrest, Durham, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 464 days.

(21) Appl. No.: 16/519,369

(22) Filed: Jul. 23, 2019

(65) Prior Publication Data
US 2020/0040817 A1    Feb. 6, 2020

Related U.S. Application Data

(60) Provisional application No. 62/702,156, filed on Jul. 23, 2018.

(51) Int. Cl.
*F02C 3/34* (2006.01)
*F02C 7/08* (2006.01)
*F02C 7/143* (2006.01)

(52) U.S. Cl.
CPC .......... *F02C 3/34* (2013.01); *F02C 7/08* (2013.01); *F02C 7/143* (2013.01)

(58) Field of Classification Search
CPC .............. F02C 3/34; F02C 7/08; F02C 7/10
See application file for complete search history.

(56) References Cited

U.S. PATENT DOCUMENTS 2,658,332 A   11/1953   Nicholson
2,660,521 A   11/1953   Teichman
(Continued)

FOREIGN PATENT DOCUMENTS

DE    35 14974    10/1986
DE    4443077    6/1996
(Continued)

OTHER PUBLICATIONS

Jiang et al., "Experimental Investigation of Flow Resistance and Convection Heat Transfer of CO2 at Supercritical Pressures in a Vertical Porous Tube," *The Journal of Supercritical Fluids*, 2006, vol. 38, pp. 339-346.
(Continued)

*Primary Examiner* — William H Rodriguez
(74) *Attorney, Agent, or Firm* — Womble Bond Dickinson (US) LLP

(57) ABSTRACT

The present disclosure provides systems and methods wherein power production can be achieved with combustion of a fuel utilizing flameless combustion. A fuel may be combusted in a combustor/turbine in a substantially flameless operation to produce a combustion product stream that can be expanded for power generation. After expansion, the output stream can be treated to generate a recycle $CO_2$ stream into which an oxidant can be input. The recycle $CO_2$ stream including the oxidant can be injected into the combustor/turbine to effect combustion in a substantially flameless state. Various control schemes can be implemented to automatically control the concentration of oxygen present in the recycle $CO_2$ stream that is injected into the combustor/turbine in order to achieve and/or maintain substantially flameless combustion.

16 Claims, 8 Drawing Sheets

(56) References Cited

U.S. PATENT DOCUMENTS

| | | | |
|---|---|---|---|
| 2,861,423 A | 11/1958 | Jerie et al. | |
| 3,399,022 A | 8/1968 | Bailey | |
| 3,420,631 A | 1/1969 | Boyd | |
| 3,623,711 A | 11/1971 | Thorstenson | |
| 3,793,861 A | 2/1974 | Burkhard et al. | |
| 3,846,985 A * | 11/1974 | Michels | F02G 1/047 60/521 |
| 3,857,921 A | 12/1974 | Tamura et al. | |
| 3,921,544 A | 11/1975 | Reese | |
| 3,957,418 A * | 5/1976 | Sata | F23C 13/00 431/9 |
| 3,971,211 A | 7/1976 | Wethe et al. | |
| 3,976,443 A | 8/1976 | Paull et al. | |
| 4,268,765 A | 5/1981 | Hoover | |
| 4,271,664 A * | 6/1981 | Earnest | F02C 3/34 60/39.181 |
| 4,386,941 A | 6/1983 | Crouch et al. | |
| 4,422,925 A | 12/1983 | Williams et al. | |
| 4,572,082 A | 2/1986 | Ueda et al. | |
| 4,673,348 A | 6/1987 | Riley et al. | |
| 4,775,314 A | 10/1988 | Stemling | |
| 4,873,930 A | 10/1989 | Egense et al. | |
| 4,895,710 A | 1/1990 | Hartmann et al. | |
| 4,986,838 A | 1/1991 | Johnsgard | |
| 5,078,760 A | 1/1992 | Haldipur et al. | |
| 5,097,660 A | 3/1992 | Shekleton | |
| 5,116,394 A | 5/1992 | Garkawe | |
| 5,167,932 A | 12/1992 | Ruottu | |
| 5,408,825 A | 4/1995 | Foss et al. | |
| 5,476,375 A | 12/1995 | Khinkis et al. | |
| 5,570,679 A * | 11/1996 | Wunning | F23C 9/006 126/91 A |
| 5,597,540 A | 1/1997 | Akita et al. | |
| 5,709,077 A | 1/1998 | Beichel | |
| 5,794,431 A * | 8/1998 | Utamura | F02C 7/10 60/39.182 |
| 5,858,065 A | 1/1999 | Li et al. | |
| 6,151,887 A | 11/2000 | Haidn et al. | |
| 6,234,787 B1 | 5/2001 | Endoh et al. | |
| RE37,300 E | 7/2001 | Nagato et al. | |
| 6,279,551 B1* | 8/2001 | Iwano | F02D 41/0007 60/611 |
| 6,408,629 B1 | 6/2002 | Harris et al. | |
| 6,436,337 B1 | 8/2002 | Gross | |
| 6,497,118 B1 | 12/2002 | Schermerhorn | |
| 6,596,220 B2 | 7/2003 | Gross | |
| 6,606,851 B1 | 8/2003 | Herdy, Jr. et al. | |
| 6,617,003 B1 | 9/2003 | Lee et al. | |
| 6,843,830 B2 | 1/2005 | Sherer | |
| 6,862,877 B1 | 3/2005 | James | |
| 7,028,478 B2 | 4/2006 | Prentice, III | |
| 7,089,745 B2 | 8/2006 | Roby et al. | |
| 7,147,461 B2 | 12/2006 | Neary | |
| 7,186,091 B2 | 3/2007 | Lee | |
| 7,243,495 B2* | 7/2007 | Whelan | F02M 26/16 123/568.21 |
| 7,260,935 B2 | 8/2007 | Colibaba-Evulet et al. | |
| 7,305,831 B2* | 12/2007 | Carrea | F02C 6/18 60/772 |
| 7,334,396 B2 | 2/2008 | Erickson et al. | |
| 7,516,620 B2 | 4/2009 | Patrick et al. | |
| 7,700,049 B2 | 4/2010 | Clark et al. | |
| 7,736,599 B2 | 6/2010 | Chin et al. | |
| 7,955,406 B2 | 6/2011 | Smith | |
| 8,671,658 B2 | 3/2014 | Prabhu | |
| 8,899,969 B2 | 12/2014 | Gard et al. | |
| 2002/0187449 A1* | 12/2002 | Doebbeling | F23C 9/00 431/350 |
| 2004/0142294 A1 | 7/2004 | Niass et al. | |
| 2004/0209129 A1* | 10/2004 | Carrea | F23L 7/007 431/9 |
| 2004/0219079 A1 | 11/2004 | Hagen et al. | |
| 2005/0076647 A1* | 4/2005 | Farhangi | F23R 3/40 60/776 |
| 2005/0135984 A1 | 6/2005 | Ferron et al. | |
| 2005/0225424 A1 | 10/2005 | Tsukada | |
| 2005/0282097 A1* | 12/2005 | Carrea | F23C 9/006 431/9 |
| 2006/0037323 A1 | 2/2006 | Reynolds et al. | |
| 2006/0080966 A1 | 4/2006 | Widener | |
| 2007/0101722 A1 | 5/2007 | Hoffmann | |
| 2007/0234735 A1 | 10/2007 | Mosbacher et al. | |
| 2007/0240425 A1 | 10/2007 | Malavasi et al. | |
| 2007/0274876 A1 | 11/2007 | Chiu et al. | |
| 2008/0250772 A1 | 10/2008 | Becker et al. | |
| 2009/0188256 A1 | 7/2009 | Woodcock et al. | |
| 2009/0255450 A1 | 10/2009 | Stone et al. | |
| 2010/0050517 A1 | 3/2010 | Tsilevich | |
| 2010/0083882 A1 | 4/2010 | Widener et al. | |
| 2010/0092280 A1 | 4/2010 | Draper | |
| 2010/0107642 A1 | 5/2010 | Bhaisora et al. | |
| 2010/0115960 A1* | 5/2010 | Brautsch | F23C 6/042 60/772 |
| 2010/0242483 A1 | 9/2010 | Snyder et al. | |
| 2010/0287939 A1* | 11/2010 | Cornwell | F23C 9/006 60/748 |
| 2010/0300063 A1 | 12/2010 | Palmer et al. | |
| 2010/0300110 A1 | 12/2010 | Kraemer et al. | |
| 2010/0307431 A1 | 12/2010 | Buchanan | |
| 2011/0056373 A1 | 3/2011 | Baxter | |
| 2011/0056737 A1 | 3/2011 | Hagiwara et al. | |
| 2011/0067379 A1 | 3/2011 | Khan et al. | |
| 2012/0064465 A1* | 3/2012 | Borissov | F23C 7/004 431/12 |
| 2012/0131925 A1 | 5/2012 | Mittricker et al. | |
| 2013/0029277 A1* | 1/2013 | Koizumi | F23R 3/343 431/354 |
| 2013/0219910 A1 | 8/2013 | Botarelli | |
| 2013/0269360 A1 | 10/2013 | Wichmann et al. | |
| 2015/0020497 A1* | 1/2015 | Iwai | F02C 3/34 60/39.23 |
| 2015/0027099 A1 | 1/2015 | Yasunori et al. | |
| 2015/0033749 A1 | 2/2015 | Slobodyanskiy et al. | |
| 2015/0059352 A1 | 3/2015 | Myers | |
| 2016/0134291 A1* | 5/2016 | Fetvedt | F02C 3/34 700/282 |
| 2016/0363009 A1 | 12/2016 | Fetvedt et al. | |
| 2017/0015921 A1* | 1/2017 | Ju | F23J 7/00 |
| 2017/0067373 A1 | 3/2017 | Allam et al. | |
| 2017/0248083 A1 | 8/2017 | Fetvedt et al. | |
| 2020/0240326 A1* | 7/2020 | Miura | F02C 3/04 |

FOREIGN PATENT DOCUMENTS

| | | |
|---|---|---|
| DE | 4244921 C2 | 2/1998 |
| DE | 19731209 | 1/1999 |
| EP | 0 564 184 | 6/1993 |
| EP | 1 195 559 A2 | 4/2002 |
| EP | 2014 984 | 1/2009 |
| JP | S6373006 | 4/1988 |
| JP | H01111108 | 4/1989 |
| JP | H1054534 | 2/1998 |
| JP | 10-121912 A | 5/1998 |
| JP | H10141662 | 5/1998 |
| JP | H11336528 | 12/1999 |
| JP | 200444845 | 2/2004 |
| JP | 201025538 | 2/2010 |
| RU | 2138661 C1 | 9/1999 |
| SU | 373488 | 5/1973 |
| TW | 200623226 | 7/2006 |
| WO | WO 98/21522 | 5/1998 |
| WO | WO 2005/114050 | 12/2005 |
| WO | WO 2008/057685 | 5/2008 |
| WO | WO 2009/007356 | 1/2009 |

OTHER PUBLICATIONS

Sater et al., "A CFD Simulation of Coal Syngas Oxy-Combustion in a High-Pressure Supercritical CO2 Environment," *Proceedings of*

(56) References Cited

OTHER PUBLICATIONS

*ASME Turbo Expo 2017: Turbomachinery Technical Conference and Exposition*, Jun. 26-30, 2017, Charlotte, NC, USA, pp. 1-12.

\* cited by examiner

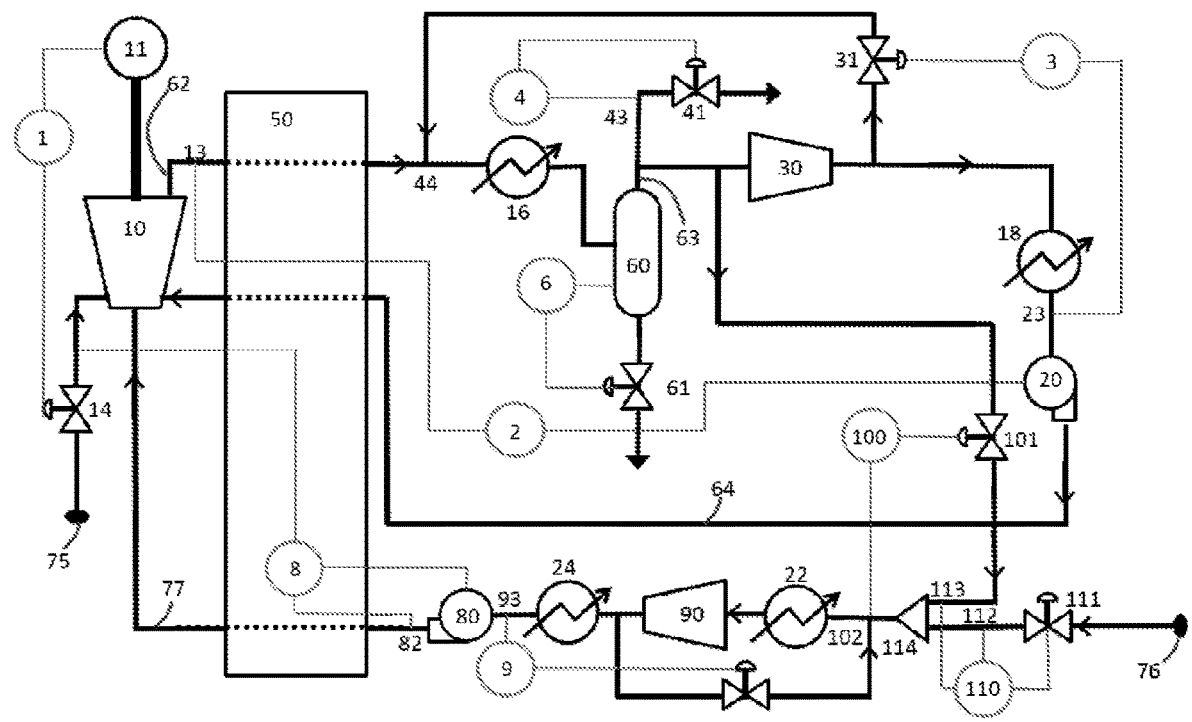
FIG. 2 - Prior Art
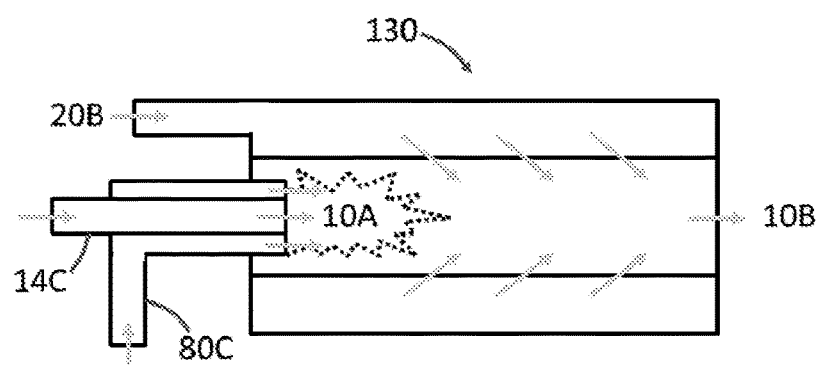
FIG. 3

SYSTEMS AND METHODS FOR POWER GENERATION WITH FLAMELESS COMBUSTION

CROSS-REFERENCE TO RELATED APPLICATIONS

The present application claims priority to U.S. Provisional Patent Application No. 62/702,156, filed Jul. 23, 2018, the disclosure of which is incorporated herein by reference in its entirety.

FIELD OF THE DISCLOSURE

The present disclosure relates to systems and methods for production of power, specifically electrical power. More particularly, flameless combustion of a fuel is used to produce a high pressure combustion product stream that can be expanded for power generation.

BACKGROUND

Utilization of $CO_2$ (particularly in supercritical form) as a working fluid in power production has been shown to be a highly efficient method for power production. See, for example, U.S. Pat. No. 8,596,075 to Allam et al., the disclosure being incorporated herein by reference, which describes the use of a directly heated $CO_2$ working fluid in a recuperated oxy-fuel Brayton cycle power generation system with virtually zero emission of any streams to the atmosphere. Nevertheless, such systems and methods require operation at significantly high pressures and temperatures that can impart significant stresses on the various pieces of equipment that are required for use. Accordingly, there remains a need in the art for further systems and method for power production with improved efficiency that preferably can be operated under less stressful conditions.

SUMMARY OF THE DISCLOSURE

The present disclosure provides systems and methods wherein power generation can be achieved with combustion of a fuel, specifically oxy-combustion, under conditions that provide one or more of improved controllability, lower peak temperature, and more complete oxidation of the fuel. Conventional combustion systems, such as those described in U.S. Pat. No. 8,596,075 to Allam et al., have high peak flame temperatures that can be difficult to contain. According to the present disclosure, flameless combustion can be achieved at significantly lower temperatures and thus provide a less stressful environment for the equipment used in the systems and methods. Also, highly recycled oxy-fuel cycles have added complexity in the control and equipment layout which can be reduced or eliminated according to the present disclosure. Included are also methods of starting the power cycle, which can be difficult to achieve without complex ignition systems and controls.

According to the present disclosure, flameless combustion can specifically mean that combustion of the fuel is carried out such that one or more of the following conditions exists: there is substantially or completely no flame front; there is substantially or completely no visible flame; there is substantially or completely no ultraviolet or ionization detection; there is substantially or completely no noise or roar. Preferably, in flameless combustion, carbon monoxide (CO) and nitrogen oxides (NOx) are abated to very small residual values. In one or more embodiments, flameless combustion can be achieved by providing a defined set of reaction conditions. These conditions can include the mass percent of oxygen present in the combustion reactants, the mass percent of dilutants (e.g., $N_2$, $CO_2$, $H_2O$) present in the combustion reactants, the recirculation ratio, and the temperature of the reactants. This is exemplified in FIG. 1 (taken from the Oil and Gas Portal website), and the conditions shown therein for flameless combustion particularly may be applied to the presently disclosed systems and methods. In particular, the flameless combustion region can be stabilized by increasing the temperature of the oxidant, lowering the oxygen concentration, and increasing the dilutant concentration. Moving a combustion reaction to substantially flameless conditions can thus be effective to eliminate the need for various elements that would otherwise be necessary in a power production plant, such as pumps, piping, heat exchangers, and the like that would otherwise be needed to provide the oxidant stream. Instead, for example, the oxidant may be added directly to a recycle stream being input to the combustor.

In one or more embodiments, the present disclosure can provide methods for power generation. For example, such method can comprise: providing a recycle stream comprising $CO_2$; adding an oxidant to the recycle stream comprising $CO_2$ such that the recycle stream comprising $CO_2$ further includes the oxidant in an amount of about 2% to about 15% molar; injecting recycle stream comprising $CO_2$ and including the oxidant into a combustion turbine with a fuel to cause combustion of the fuel and formation of a combustion product stream; and generating power by expanding the combustion product stream in the combustion turbine. In further embodiments, the methods can be defined in relation to one or more of the following statements, which can be combined in any number or order.

The combustion of the fuel can be substantially flameless.

The method further can comprise heating the recycle stream comprising $CO_2$ and including the oxidant to a temperature in the range of about 400° C. to about 2000° C. prior to injecting into the combustion turbine.

Heating the recycle stream comprising $CO_2$ and including the oxidant can comprise passing the recycle stream comprising $CO_2$ and including the oxidant through a recuperative heat exchanger.

The heating can comprise utilizing heat withdrawn from the combustion product stream.

Heating the recycle stream comprising $CO_2$ and including the oxidant can comprise passing the recycle stream comprising $CO_2$ and including the oxidant through a dedicated heater.

The method can comprise withdrawing a sidestream from the recycle stream comprising $CO_2$ and including the oxidant and passing only the sidestream through the dedicated heater.

The method further can comprise treating the combustion product stream exiting the combustion turbine to remove one or more components thereof and form the recycle stream comprising $CO_2$.

The further can comprise pressurizing the recycle stream comprising $CO_2$ and including the oxidant using one or both of a pump and compressor to a pressure suitable for input to the combustion turbine.

The oxidant can be added to the recycle stream comprising $CO_2$ at an inlet positioned upstream from a pump and downstream from a compressor.

The oxidant can be added to the recycle stream comprising $CO_2$ at an inlet positioned upstream from a compressor.

The combustion turbine can comprise a combustor having an inlet end and an outlet end spaced apart along a longitudinal axis thereof, the combustor having a combustion chamber positioned between the inlet end and the outlet end.

The method can comprise injecting the fuel into the combustor substantially only proximate to the inlet end, and injecting the recycle stream comprising $CO_2$ and including the oxidant into the combustor proximate to the inlet end and also into the combustion chamber along at least a portion of a longitudinal axis of the combustion chamber.

The method can comprise measuring an oxygen content of the recycle stream comprising $CO_2$ to generate an oxidant inlet command that regulates the adding of the oxidant to the recycle stream comprising $CO_2$ at an oxidant inlet so that the concentration of oxygen in the recycle stream comprising $CO_2$ and including the oxidant is maintained within a defined oxygen concentration.

The defined oxygen concentration can be about 4% to about 7% molar based on the total content of the recycle stream comprising $CO_2$ and including the oxidant.

The method can comprise regulating the adding of the oxidant to the recycle stream comprising $CO_2$ at the oxidant inlet so that the concentration of the oxygen in the recycle stream comprising $CO_2$ and including the oxidant is initially set at a first, higher concentration that promotes flamed combustion and is then set to a second, lower concentration that promotes flameless combustion.

In one or more embodiments, the present disclosure can relate to a system for power generation. For example, a system according to the present disclosure can comprise: a combustion turbine; a fuel line configured for delivery of a fuel to the combustion turbine; a recycle line configured for delivery of a recycle stream comprising $CO_2$ to the combustion turbine; one or both of a pump and compressor configured for pressurizing the recycle stream comprising $CO_2$ to a pressure suitable for input to the combustion turbine; and an oxidant inlet configured for addition of an oxidant to the recycle line, the oxidant inlet being positioned upstream from the combustion turbine. In further embodiments, the system can be defined in relation to one or more of the following statements, which can be combined in any number and order.

One of the following conditions can be met: the oxidant inlet is positioned upstream from a pump and downstream from a compressor; the oxidant inlet is positioned upstream from a compressor.

The combustion turbine can be configured for flameless operation.

The combustion turbine can comprise a combustor having an inlet end and an outlet end spaced apart along a longitudinal axis thereof, the combustor having a combustion chamber positioned between the inlet end and the outlet end.

The combustor can be configured so that the fuel is received into the combustor substantially only proximate to the inlet end, and the recycle stream comprising $CO_2$ and including the oxidant is received into the combustor proximate to the inlet end and also into the combustion chamber along at least a portion of a longitudinal axis of the combustion chamber. The combustor can comprise a recycle nozzle splitter, an aligned recycle stream nozzle section, and a tangential recycle stream nozzle section.

BRIEF DESCRIPTION OF THE DRAWINGS

FIG. 2 is a diagram showing a power production system utilizing flamed combustion and including various control functions built therein;

FIG. 3 is a diagram showing a combustor for use in flamed combustion in a power production system.

DETAILED DESCRIPTION

Figure 1:
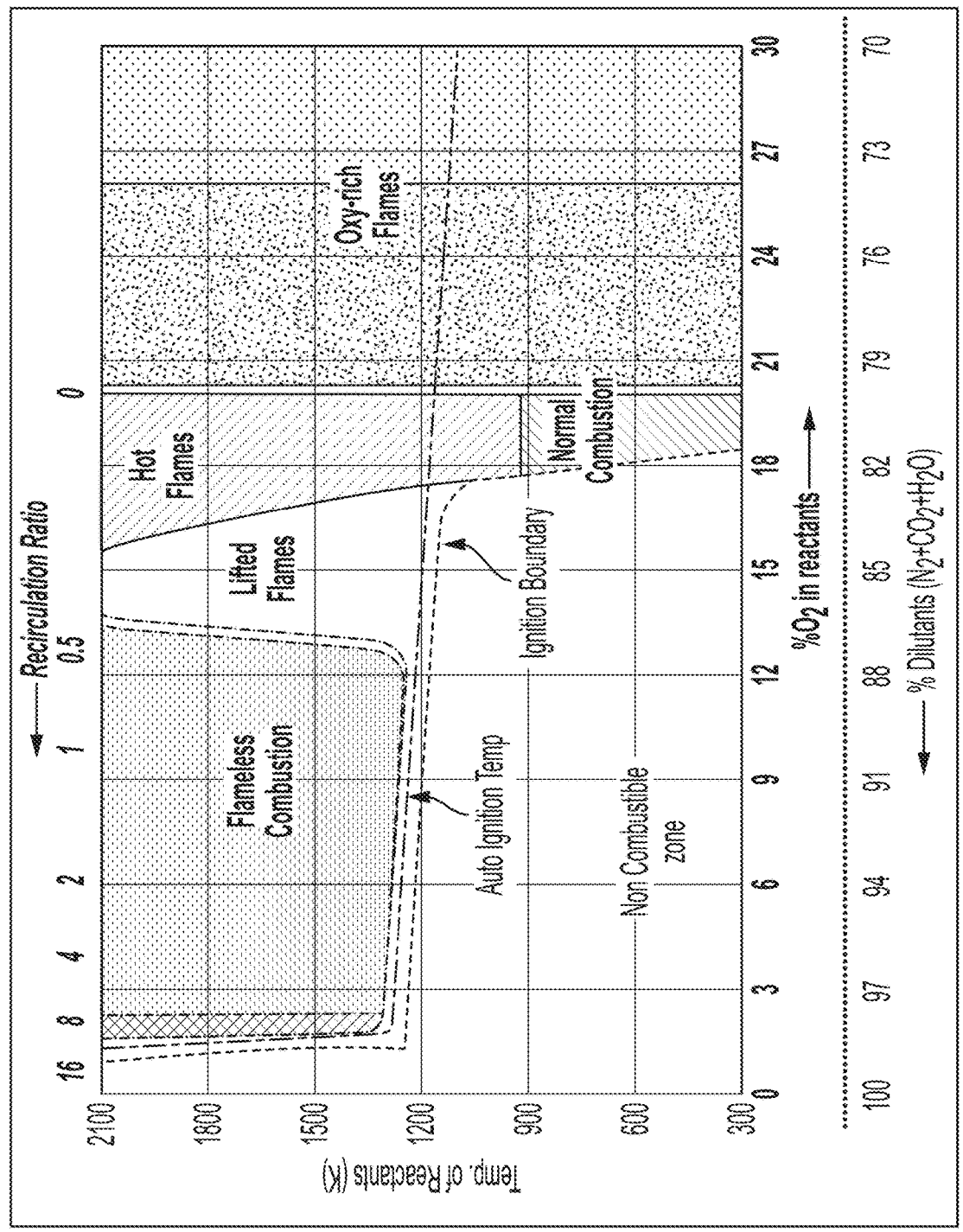
FIG. 1 is a chart showing combustion characteristics in relation to reaction temperature, recirculation ratio, percent $O_2$, and percent dilutants.

The present subject matter will now be described more fully hereinafter with reference to exemplary embodiments thereof. These exemplary embodiments are described so that this disclosure will be thorough and complete, and will fully convey the scope of the subject matter to those skilled in the art. Indeed, the subject matter can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

In one or more embodiments of the present disclosure relates to systems and methods for power production with substantially flameless combustion. The present disclosure more particularly can relate to one or more control schemes that provide for control of a power production system. Control schemes for oxy-combustion power production systems and methods are disclosed, for example, in U.S. Pat. Pub. No. 2016/0134291 to Fetvedt et al., the disclosure of which is incorporated herein by reference. For example, FIG. 2 shows a control configuration for a power production cycle for a direct fired, oxy-fuel cycle burning a carbonaceous fuel with oxygen. Briefly, fuel from fuel source 75 passes through main fuel valve 14 to enter the combustion turbine 10 for combustion with oxidant passed through line 77 from oxidant source 76. The expansion through the combustion turbine 10 causes power generation in electric power generator 11. Turbine exhaust in turbine exhaust line 62 may be cooled in optional recuperative heat exchanger 50 and/or in exhaust water cooler 16 before passage to a water separator 60 where water is separated for exit from the system through water output valve 61. A substantially purified recycle stream (e.g., comprising predominately carbon dioxide) exits the water separator 60 in line 63 and passes sequentially to recycle compressor 30, recycle water cooler 18, and recycle pump 20. High pressure recycle carbon dioxide in high pressure recycle line 64 is then passed to the combustion turbine 10. Oxidant from oxidant source 76 passes through the oxidant valve 111 before passing through union 114 for dilution blending with recycle carbon dioxide provided through pressure control valve 103 from line 63. The oxidant is then passed through a first oxidant heat exchanger 22 and a second oxidant exchanger 24 with intermediate compression in compressor 90. The oxidant finally exits oxidant pump 80 in line 77 for passage into the combustion turbine 10.

In FIG. 2, the power controller 1 measures several possible items; as shown it measures the power output of an electric power generator 11. Power controller 1 commands fuel addition into the system via main fuel valve 14. As fuel is added to the system, the turbine inlet temperature will change and after expansion through the turbine, the temperature at point 13 will change. Pump controller 2 measures the temperature at point 13 and commands the power of recycle pump 20 (e.g., a variable speed pump) to change in order to maintain point 13 at a constant temperature. As the flow rate through pump 20 changes, this will change the suction pressure in front of the pump at point 23. In order to maintain constant pressure entering the pump, a spillback controller 3 measures the pressure at point 23 and controls spillback valve 31 to increase or decrease the pressure by allowing more or less fluid to spillback to point 44. As material is spilled back into the turbine exhaust stream, it is desired to maintain the pressure at point 13 substantially constant. Point 13 is in fluid communication with points 44 and 43, with their respective pressures only differing due to pressure loss through equipment and piping. The pressure at point 43 is measured by cycle outlet controller 4 which controls cycle outlet valve 41 to allow material out of the cycle in order to maintain the pressure at the measured point 44. In addition, water output controller 6 takes as its input signal the level of water in the water separator 60 and controls the level within the desired range through control of water output valve 61. Recuperative heat exchanger 50 can be present, but is not a requirement.

In the configuration shown in FIG. 2, oxidant-to-fuel ratio controller 8 measures the ratio between the mass flow of the fuel and the mass flow of the oxidant at point 82. This controller sends a signal to oxidant pump 80 (e.g., a variable speed pump) in order to change the power of the pump and allow the delivery of the correct oxidant to fuel ratio at the required pressure. Similar to the main line, oxidant spillback controller 9 measures the pressure at point 93 and controls oxidant spillback valve 91 to decrease or increase the pressure by allowing more or less fluid to be present before the oxidant compressor 90. Pressure controller 100 measures the pressure at point 102, which is the suction of oxidant compressor 90, and controls pressure control valve 103 to ensure that the pressure at point 102 remains constant. Dilution ratio controller 110 measures the ratio between incoming $CO_2$ at point 113 and $O_2$ at point 112 and controls oxidant valve 111 to ensure that the correct ratio is maintained.

The fuel stream leaving main fuel valve 14, the oxidant stream leaving oxidant pump 80, and the recycle stream leaving recycle pump 20 all enter the combustion turbine 10. As illustrated herein, the combustion turbine 10 can be configured as a single unit configured for carrying out combustion and expansion for power production. If desired, a separate combustor unit and turbine unit may be utilized. Inside of the combustion turbine 10, there is a combustor 130 as shown in FIG. 3. The fuel stream leaving main fuel valve 14 enters as injected fuel stream 14B, the oxidant stream leaving oxidant pump 80 enters as injected oxidant stream 80B, and the recycle stream leaving recycle pump 20 enters as injected recycle stream 20B. In a generic combustor, the injected fuel stream 14B enters the combustor 130 through a fuel nozzle 14C which directs the fuel into the combustor flame zone 10A. The oxidant stream 80B enters the combustor 130 through an oxidant nozzle 80C which directs the oxidant into the flame zone 10A. In general, these nozzles contain specific geometric features, such as jets and swirlers, which cause the two streams to mix and encourage flame holding and maintain flame shape of the flame zone 10A to encourage complete burnout of the fuel. Further down the combustor, the injected recycle stream 20B enters the combustor 130 where it mixes with the flame and provides a lowering of the temperature and increases the uniformity of the mixture before it leaves the combustor as combustion stream 10B where it then enters the turbine portion of the combustion turbine 10. Typical combustion in this fashion, however, suffers from various drawbacks that are addressed according to the present disclosure.

Figure 4A:
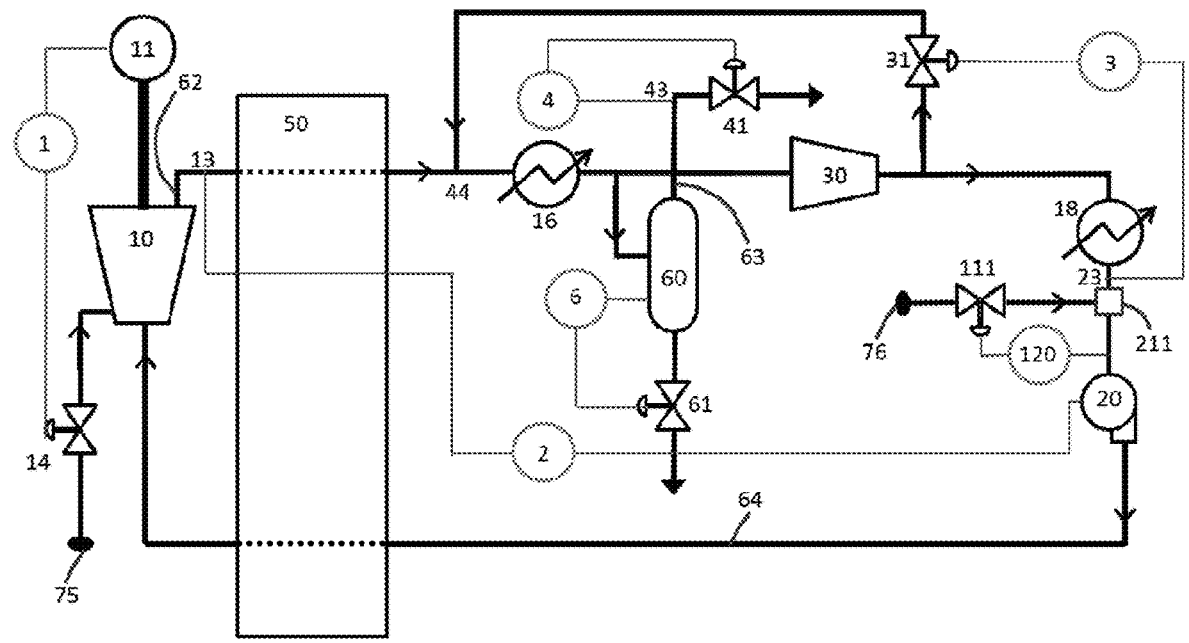
FIG. 4A is a diagram of a power production system useful in power production methods utilizing flameless combustion according to embodiments of the present disclosure.

A power production system and method according to embodiments of the present disclosure is illustrated in FIG. 4A. Elements of FIG. 4A not otherwise described below are understood to correspond to like elements as described in relation to FIG. 2. The power cycle illustrated in FIG. 4A is substantially similar to the power cycle illustrated in FIG. 2 but is specifically configured for flameless combustion. Due to the flameless combustion configuration, equipment needed for the oxidant metering, mixing, and supply can be substantially or completely eliminated.

In the illustrated embodiment of FIG. 4A, oxygen controller 120 measures the oxygen content of the recycle stream at point 23 and controls oxidant valve 111 to maintain a constant oxygen concentration in the recycle stream. In the present embodiment, it is important to note that the oxidant train otherwise described in relation to FIG. 2 is substantially done away with, and the oxygen from oxidant source 76 can be simply controlled with the oxygen controller 120 and the re-positioned oxidant valve 111. If desired, however, a mixing ratio element can be paired to controller 1. Then if the ratio is correct, it is possible to indirectly dictate the residual oxygen concentration in the recycle stream. As illustrated in FIG. 4A, the disclosed systems and methods can be adapted to or configured to include an oxidant source 76, an oxidant valve 111, and an oxidant inlet 211 (e.g., a union, three-way coupling, etc.) configured for addition of oxidant directly to the recycle stream.

As previously discussed, in various embodiments, the oxygen level of the streams being injected into the combustion turbine 10 is generally much lower than in traditional oxy-fuel, oxygen enriched combustion, artificial air, or air. In one or more embodiments, for example, the total oxygen content of the streams injected into a turbine/combustor can be in the range of about 2% to about 15%, about 3% to about 15%, about 3% to about 10%, about 4% to about 10%, or about 4% to about 8% by mass. The concentration may be based on the total mass of the oxidant stream injected into the turbine/combustor. More particularly, a recycle stream comprising carbon dioxide and including the oxidant may have a total oxygen concentration as noted above, and the oxygen concentration may thus be based upon the total mass of the recycle stream comprising carbon dioxide and including the oxidant. The oxidant stream may include the oxygen (or other oxidant) in the amount noted above, and the remaining content of the oxidant stream may comprise materials that exclude further oxidants. For example, when the oxidant stream is the recycle stream comprising carbon dioxide and including the oxygen (or other oxidant), the stream may otherwise be formed of non-oxidant materials (e.g., nitrogen or other inert gases or diluents). In some embodiments, the recycle stream thus may comprise oxidant in the concentration noted above and one or more diluents.

Figure 4B:
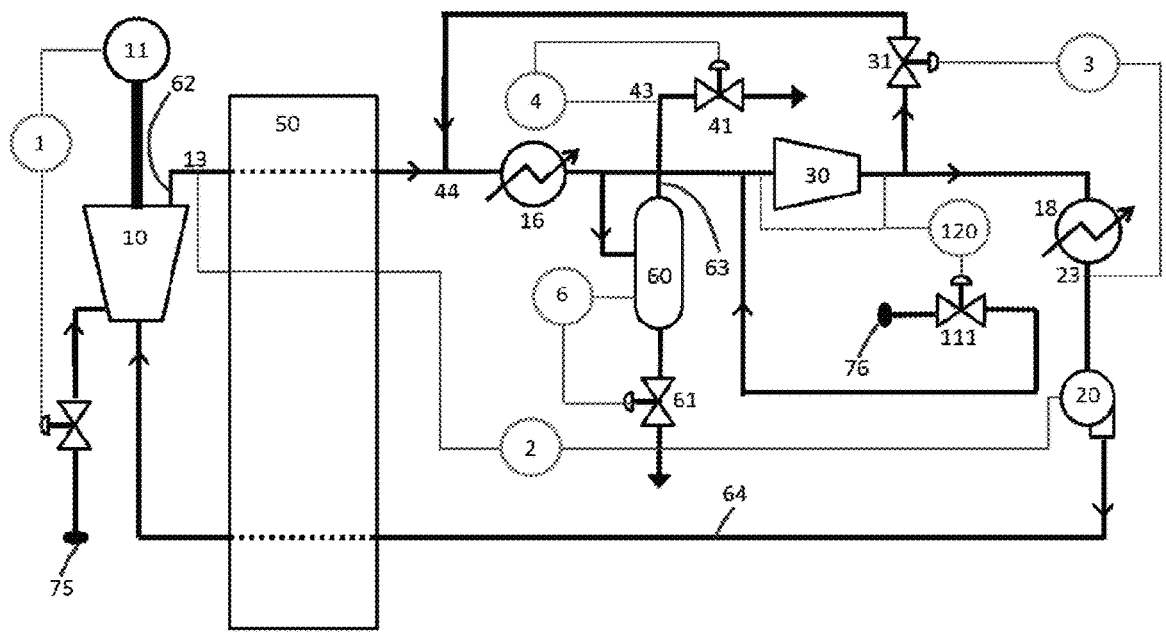
FIG. 4B is a diagram of a further power production system useful in power production methods utilizing flameless combustion according to embodiments of the present disclosure.

As illustrated, the oxygen can be introduced to the recycle line between the compressor 30 and the recycle pump 20. The oxygen can optionally be introduced to the recycle line 63 at a relatively lower pressure, such as shown in FIG. 4B. Alternatively, the oxygen may be compressed to a higher pressure in input into high pressure recycle stream line 64 downstream of the recycle pump 20. All other controls in the plant may be operated substantially similarly as they would, such as in relation to the system and method illustrated in relation to FIG. 2.

In comparing the illustrations of FIG. 2 and FIG. 4A, for example, it is evident that the presently disclosed system benefits from the ability to substantially or completely avoid the necessity of utilizing a dedicated oxidant line for introduction of the oxidant into the combustion turbine 10. Thus, in some embodiments, the presently disclosed systems and methods can be adapted to or configured to expressly exclude a dedicated oxidant line entering the combustion turbine 10. As such, the disclosed systems and methods can comprise a combustion turbine 10 having at least one fuel input and at least one recycle stream input while expressly excluding a separate oxidant input. In this instance, the at least one recycle stream input can be configured for input of the recycle stream (e.g., a carbon dioxide stream) that has an oxidant added thereto.

In one or more embodiments, the input of the oxidant (e.g., substantially pure oxygen) from the oxidant source 76 as described in relation to FIG. 4A may be modified. For example, in relation to FIG. 4B, the oxygen controller 120 can be configured for measuring the oxygen content of the recycle stream at a point downstream from the recycle compressor 30, and this may be substantially identical to the measurement taken at point 23. Alternatively, the oxygen controller 120 can be configured for measuring the oxygen content of the recycle stream at a point upstream from the recycle compressor 30 but downstream from the water separator 60, and this may substantially correspond to a measurement taken at point 43. The oxygen controller 120 then controls oxidant valve 111 to provide input of the oxidant into the recycle stream upstream of the recycle compressor 30 and downstream of the water separator 60. In some embodiments, oxygen can additionally or alternatively be provided directly at point 13 in the systems illustrated in FIG. 4A and/or FIG. 4B. Such addition can provide for the ability to operate the system sub-stoichiometrically. The introduction of oxygen at point 13 can facilitate the conversion of exhaust CO to $CO_2$ above the Boudouard temperature in heat exchanger 50 and therefore metallurgically protect the balance of plant (BOP).

Figure 5:
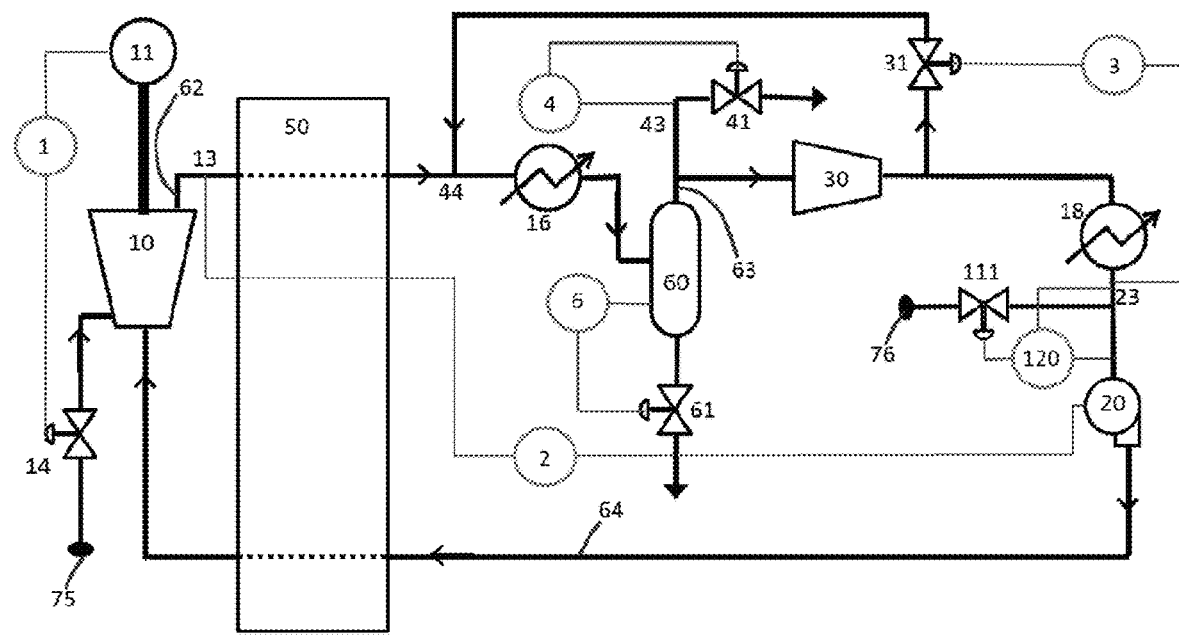
FIG. 5 is a diagram of yet another power production system useful in power production methods utilizing flameless combustion according to embodiments of the present disclosure.

In one or more embodiments, as exemplified in FIG. 5, controller 120 may also be adapted to or configured to measure the oxygen concentration before oxygen addition in order to provide the proper setting to provide the correct oxygen concentration in the stream entering recycle pump 20. As such, oxygen controller 120 can be adapted to or configured to measure oxygen concentration of the recycle stream at a point upstream from the point of addition of oxidant from the oxidant through oxidant valve 111 and/or at a point downstream from the point of addition of oxidant from the oxidant through oxidant dilution valve. This control can also include other possible measurements, combinations of measurements, and calculations based on data and operational parameters from elsewhere within the cycle. In addition, water separator 60 can be modified to remove other chemical species, for instance, but not limited to, $CO_2$. In this manner, the cycle can operate on another inert gas, such as, but not limited to, Ar, He, or Xe.

Figure 6:
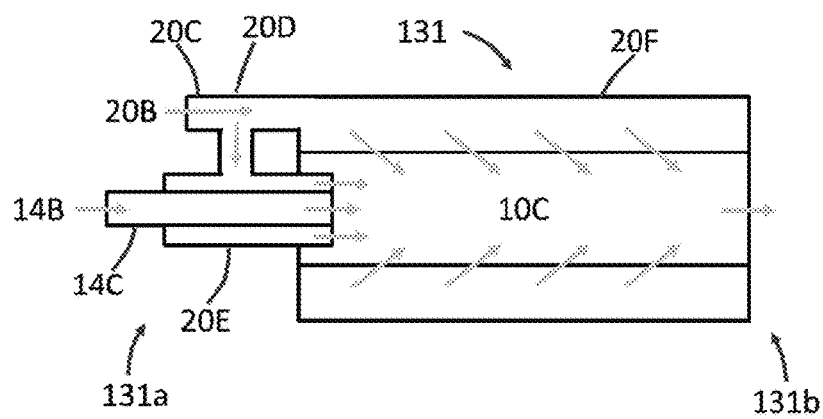
FIG. 6 is a diagram of a combustor for use in flameless combustion in a power production system and method according to embodiments of the present disclosure.

The presently disclosed systems and methods as described above and hereafter can be particularly configured for utilization of substantially flameless combustion. FIG. 6 illustrates and example embodiment of a combustor 131 that can be adapted or configured for flameless combustion according to the present disclosure. The combustor 131 (which can be a standalone component or an integral component of a combined combustion turbine) comprises an inlet end 131a and an outlet end 131b spaced apart along a longitudinal axis of the combustor and also comprises a combustor chamber 10C positioned between the inlet end and the outlet end. The combustor chamber 10C is understood to be a reaction zone wherein combustion (e.g., oxidation of the fuel with the oxidant) occurs in the substantial or complete absence of a flame.

Since there is no requirement for an independent oxidant stream, the flameless combustor 131 can be configured such that the injected recycle stream 20B (which includes a low concentration of the oxidant) can enter a combustor chamber 10C at a plurality of locations while the injected fuel stream 14B is still injected into the fuel nozzle 14C. In some embodiments, the flameless combustor 131 may be adapted or configured to include a fuel nozzle 14C that is configured for injection of the fuel into the combustion chamber 10C, and the flameless combustor may also be adapted or configured to include a split recycle stream nozzle 20C. More particularly, the split recycle stream nozzle 20C can comprise a recycle nozzle splitter 20D, an aligned recycle stream nozzle section 20E, and a tangential recycle stream nozzle section 20F. Recycle stream (including oxidant) can then be input to the flameless combustor 131 through the split recycle stream nozzle 20C where it can be divided in the recycle nozzle splitter 20D so that a portion of the recycle stream (including oxidant) can pass through the aligned recycle stream nozzle section 20E to be input to the combustion chamber 10C in line with the fuel entering through fuel nozzle 14C. A further portion of the recycle stream (including oxidant) then can enter the combustion chamber 10C through the tangential recycle stream nozzle section 20F. Recycle stream entering the combustion chamber 10C through the tangential recycle stream nozzle section 20F can enter through one or a plurality of points at any position along the length of the combustion chamber.

As seen in FIG. 6, there is no longer a specific flame zone 10A (see FIG. 3) required. Rather, the combustion chamber 10C can be configured substantially entirely as a combustion zone. In one or more embodiments, the portion of the recycle stream 20B injected through the tangential recycle stream nozzle section 20F may be adjusted to manipulate the oxidation zone. For example, the downstream injection of stream 20B through nozzle 20F may be in a direction tangential to the directional flow of the fuel stream 14B such that the recycle stream input is substantially directed at the inlet of stream 14B through the fuel nozzle 14C. This may facilitate turbulent mixing and therefor complete oxidation of the incoming fuel. It may also have the added effect of creating a better temperature distribution and shortening of the required combustor length that is needed for mixing. As illustrated, the recycle stream 20B can be injected into the combustion chamber 10C through aligned recycle stream nozzle section 20E in a direction that is substantially parallel to the injection direction of the fuel stream 14B and/or in a direction through tangential recycle stream nozzle section 20F that is substantially tangential to the injection direction of the fuel stream.

The presently disclosed systems and methods are preferably configured such that reactants entering the combustor 131 are at a sufficiently high temperature. Preferably, the reactants entering the combustor 131 are independently at a temperature in the range of about 400° C. to about 1500° C., about 425° C. to about 1000° C., about 450° C. to about 900° C., or about 500° C. to about 750° C. In some embodiments, the recycle stream comprising carbon dioxide in particularly may be provided at a temperature within the noted ranges.

Figure 7:
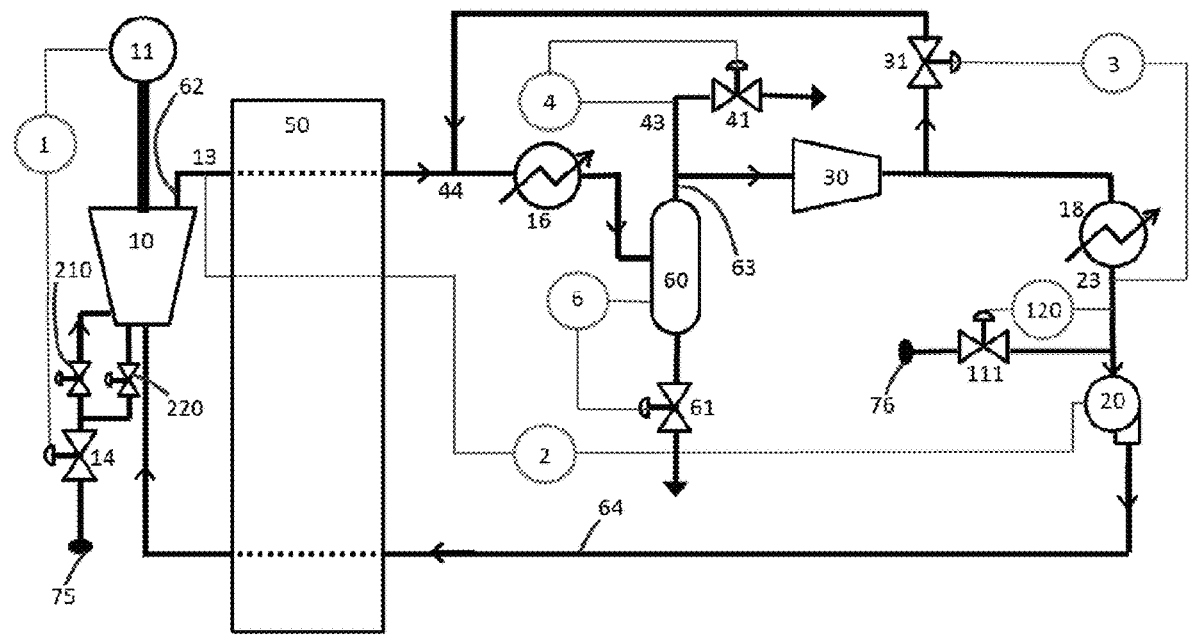
FIG. 7 is a diagram of an additional power production system useful in power production methods utilizing flameless combustion according to embodiments of the present disclosure wherein the power production method may be initially operated with flamed combustion.

FIG. 7 illustrates a system and method according to embodiments of the present disclosure wherein a power production cycle may be started from cold, operated as a conventional combustion cycle, and transition into flameless combustion once the main heat exchanger 50 is at a sufficient temperature to provide the conditions needed for flameless combustion. The cycle can be started with oxygen controller 120 operating to maintain an oxygen concentration that is significantly higher than what may be required for flameless combustion according to the present disclosure. For example, the cycle can be started with the controller 120 operating to maintain an oxygen concentration in the range of about 15% to about 40% molar or about 15% to about 30% molar. The oxygen from oxidant source 76 that is passed through oxidant valve 111 can be varied for the purposes of ignition. For example, oxygen entering the system through oxidant valve 111 can be derived from air and/or may be provided from a dedicated oxygen generation unit.

In some embodiments, the system as illustrated in FIG. 7 can be configured to include additional fuel control valves and/or multiple injection nozzles within the combustion turbine 10. For example, a first set of combustion nozzles can be substantially as identified in relation to FIG. 3 for causing combustion with a flame zone, and a second set of combustion nozzles can be substantially as identified in relation to FIG. 6 for carrying out flameless combustion. In operation, when a start-up mode is underway, flamed combustion fuel valve 210 can be open, which can direct the fuel stream from main fuel valve 14 into the first set of combustion nozzles inside of the combustion turbine 10, and a flameless combustion fuel valve 220 can be closed. Total fuel flow can be controlled by main fuel valve 14, or by flamed combustion fuel valve 210 with main fuel valve 14 operating as a stop valve. Once the conditions for flameless combustion are achieved through the heating of the main heat exchanger 50, then oxygen controller 120 can lower the oxygen concentration as the final operating value, such as within a range as previously noted above. During this transition, flamed combustion fuel valve 210 can close, and flameless combustion fuel valve 220 can open and allow the fuel to flow through the second set of combustion nozzles inside of the combustor which are more conducive to flameless combustion.

Figure 8:
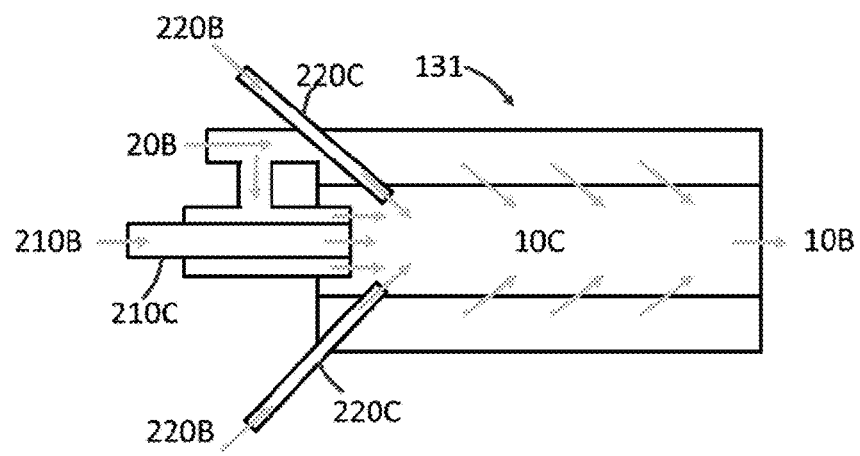
FIG. 8 is a diagram of a combustor for use in flamed and flameless combustion in a power production system and method according to embodiments of the present disclosure.

In some embodiments, a combustor 131 adapted or configured for flameless combustion can include nozzle configurations as illustrated in FIG. 8, which particularly illustrates an example of the different fuel delivery nozzles that can be used by valves 210 and 220. Specifically, in FIG. 8, fuel stream 210B from flamed combustion fuel valve 210 can pass through one or more substantially centrally oriented fuel nozzles 210C, and fuel stream 220B from valve 220 can pass through one or more substantially tangentially oriented fuel nozzles 220C. Nozzles and flows for the recycle stream 20B in FIG. 8 can be substantially the same as illustrated in relation to FIG. 6.

Figure 9:
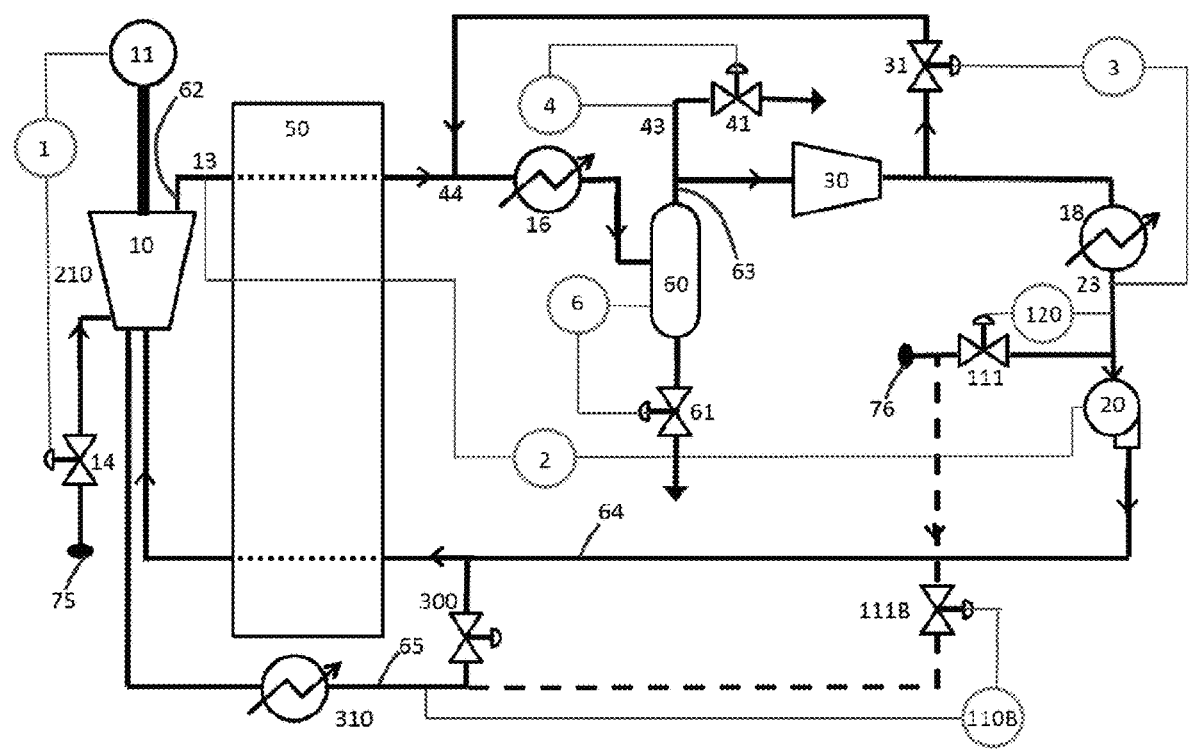
FIG. 9 is a diagram of still another power production system useful in power production methods utilizing flameless combustion according to embodiments of the present disclosure wherein the power production method may be initially operated with flamed combustion.

FIG. 9 illustrates a further example embodiment of a system and method for starting of a power cycle from a substantially cold state. In this example, there is a side stream taken from the recycle stream and passed through recycle sidestream valve 300, which can be controlled by a main plant controller or a dedicated controller as desired. This recycle sidestream in line 65 goes through a recycle sidestream heater 310 and has the temperature increased until it achieves the correct conditions for flameless combustion inside of combustion turbine 10. The heat supplied by the heater can come from any source, such as, but not limited to, electric, external gas fired, nuclear, steam, intercooling of other process equipment, or solar. There is potentially a smaller flame zone within this combustor until the main heat exchanger due to the differences in flows between the side stream and the main stream. In addition, there is an optional oxygen controller 110B which may increase the oxygen content in the recycle sidestream in line 65 through sidestream oxidant valve 111B, and the sources of such oxygen again may vary. And, although not shown, this option can also incorporate valves 210 and 220 for fuel control in substantially the same configuration as illustrated in FIG. 7. Valve 300 may, or may not be, closed once the cycle is operating at full power.

Figure 10:
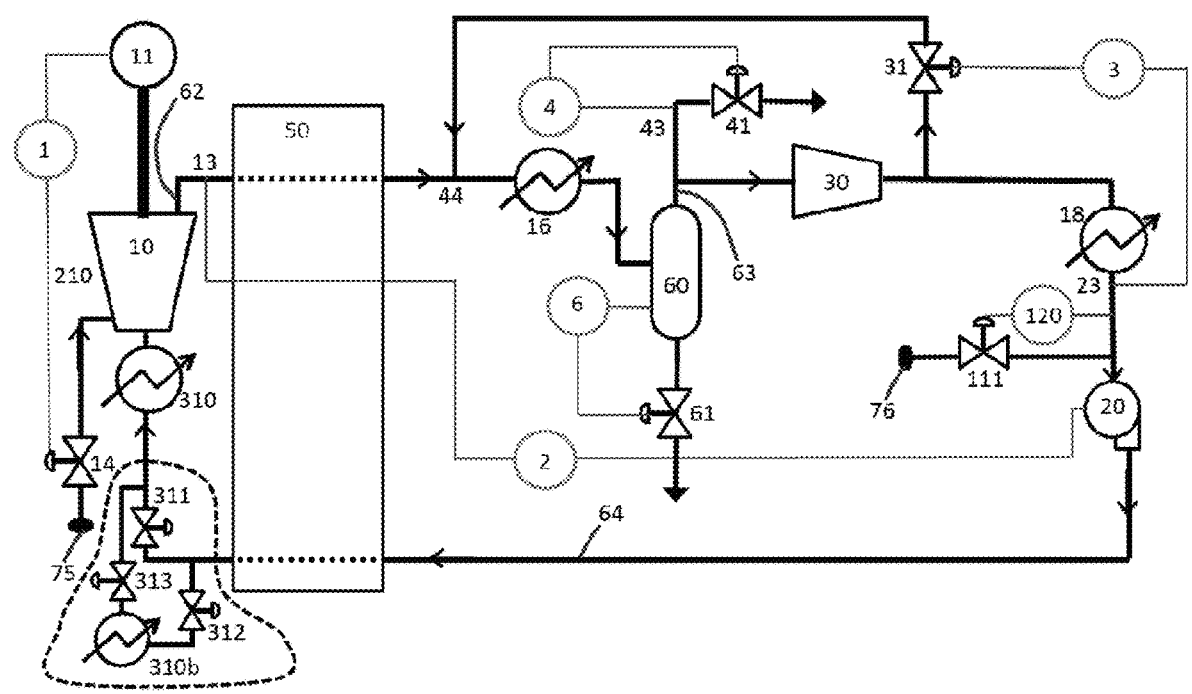
FIG. 10 is a diagram of still an additional power production system useful in power production methods utilizing flameless combustion according to embodiments of the present disclosure.

FIG. 10 a further example embodiment of a system and method according to the present disclosure wherein a recycle in-line heater 310a is located on the high pressure recycle line 64. In this manner, the recycle in-line heater 310a provides the heat that is lacking from the main heat exchanger 50 to allow the cycle to be started and operated until the recycle in-line heater 310a is no longer needed. In this configuration, the recycle in-line heater 310a can also be used to maintain equipment temperatures during transient maneuvers, load shedding, trips, and the like. FIG. 10 also shows an optional embodiment wherein a recycle heater 310b is provided in an isolatable configuration that also includes a first recycle heater valve 311, a second recycle heater valve 312, and a third recycle heater valve 313. The recycle heater valves (311, 312, 313) can be adapted or configured to allow the recycle heater 310b to be removed from the flow path during operation when it was not needed. This can allow a lower pressure rating on the equipment.

Figure 11:
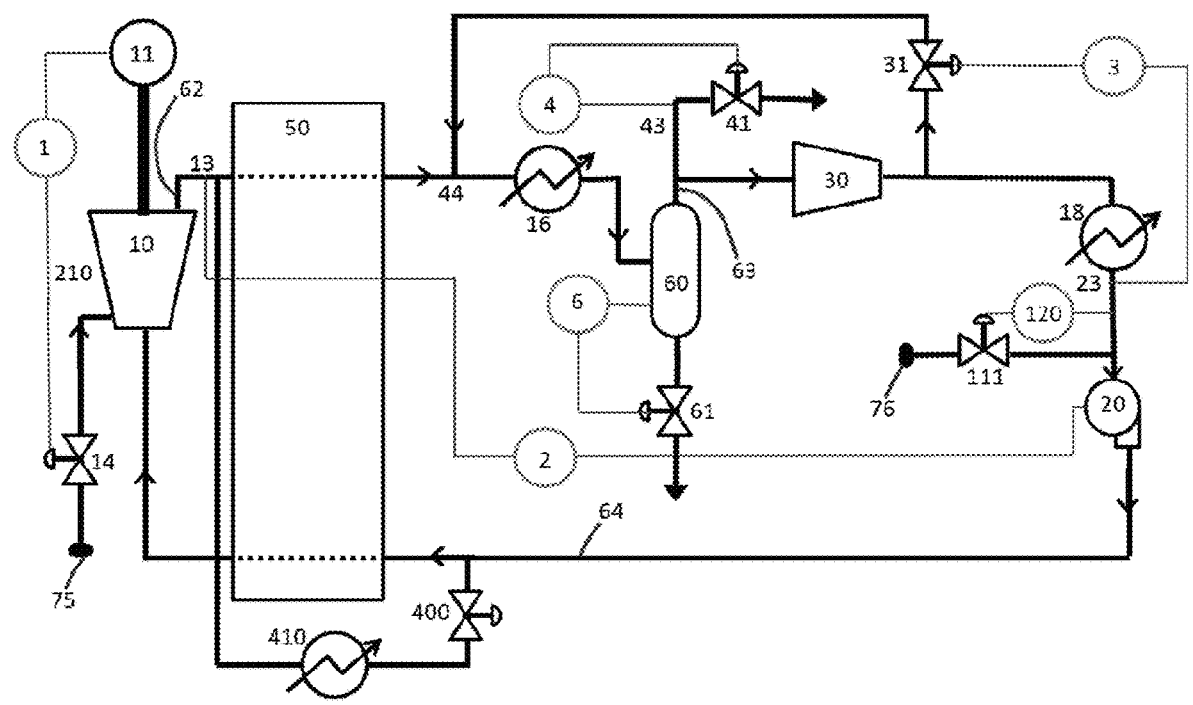
FIG. 11 is a diagram of yet an additional power production system useful in power production methods utilizing flameless combustion according to embodiments of the present disclosure.

FIG. 11 illustrates a further example embodiment of a system and method according to the present disclosure particularly configured for starting of a power plant and can specifically incorporate the addition of heater valve 400 and an additive heater 410, each of which independently may be controlled by a master plant controller or one or more dedicated controllers as desired. The additive heater 410 can provide heat from any possible source, and non-limiting examples are natural gas fired, direct or indirect, electric, solar, intercooling of other process equipment, and the like. The additive heater 410 can provide heat to the system to increase the temperature of the main heat exchanger 50 until the system is capable of operating in a flameless manner. When the system is ready, fuel can be added and the system can be ignited. Optionally, additive heater 410 can be placed directly on the turbine exhaust and operate without the bypass stream provided by heater valve 400. Additive heater 410 may optionally be used to reduce fuel consumption at main fuel valve 14 without affecting power output at the combustion turbine 10. As main fuel valve 14 closes, the combustion temperature will drop. This will induce a reduction in exhaust temperature at point 13. Before pump controller 2 is activated, additive heater 410 may increase the exhaust temperature thereby maintaining turbine flow and pressure. This type of operation may be beneficial when the heat added by additive heater 410 is of lower economic value than the fuel used at main fuel valve 14. A non-limiting example could be that a coal powered steam turbine system provides steam for operation of additive heater 410. Steam can also be provided by a solar array. The additive heater 410 and/or the recycle sidestream heater 310 and/or the recycle in-line heater 310a and/or the recycle heater 310b may independently be referred to as a dedicated heater in that the heater is dedicated for heating of the recycle stream comprising the $CO_2$ and the oxidant.

In further embodiments, the heating can be an integral part of heat exchanger 50. Heat exchanger 50 may have placed within its structure heating elements deriving energy from but not limited to sources such as electricity, oil, nuclear, solar, and the like. For an example, the elements may be units that convert electrical energy into thermal energy. The elements may take from but are not limited to electricity via renewable resources like wind and solar energies. As the renewable resources vary in output during the day, so will the available resistive heating in heat exchanger 50. Power controller 1 may be configured to maintain a constant power output. This will inherently force oxygen controller 120 to vary the amount of input oxygen. Such a scheme can allow for automatic instant load following without thermal or pressure cycling of the power generation plant. It may also allow the power system to ramp power output of the facility during startup faster than oxygen may be available due to the supplemental heating.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

DRAWINGS LEGEND

1 Power Controller
2 Pump Controller
3 Spillback Controller
4 Cycle Outlet Controller
6 Water Output Controller
8 Oxidant-to-Fuel Ratio Controller
10 Combustion Turbine
10A Combustor Flame Zone
10B Combustion Stream
10C Combustor Chamber
11 Power Generator
14 Main Fuel Valve
14B Injected Fuel Stream
14C Fuel Nozzle
16 Exhaust Water Cooler
18 Recycle Water Cooler
20 Recycle Pump
20B Injected Recycle Stream
20C Recycle Stream Nozzle
20D Recycle Nozzle Splitter
20E Aligned Recycle Stream Nozzle Section
20F Tangential Recycle Stream Nozzle Section
22 First Oxidant Heat Exchanger
24 Second Oxidant Heat Exchanger
30 Recycle Compressor
31 Spillback Valve
41 Cycle Outlet Valve
50 Recuperative Heat Exchanger
60 Water Separator
61 Water Output Valve
62 Turbine Exhaust Line
63 Recycle Stream Line
64 High Pressure Recycle Line
65 Recycle Sidestream Line
75 Fuel Source
76 Oxidant Source
77 Oxidant Line
80 Oxidant Pump
80B Injected Oxidant Stream
80C Oxidant Nozzle
90 Oxidant Compressor
91 Oxidant Spillback Valve
100 Pressure Controller
103 Pressure Control Valve
110 Dilution Ratio Controller
110B Oxygen Controller
111 Oxidant Valve
111B Sidestream Oxidant Valve
114 Union
120 Oxygen Controller
130 Combustor
131 Flameless Combustor
131a Combustor Inlet End
131b Combustion Outlet End
210 Flamed Combustion Fuel Valve
210B Fuel Stream For Flamed Combustion
210C Centrally Oriented Fuel Nozzle
211 Oxidant Inlet
220 Flameless Combustion Fuel Valve
220B Fuel Stream For Flameless Combustion
220C Tangentially Oriented Fuel Nozzle
300 Recycle Sidestream Valve
310 Recycle Sidestream Heater
310a Recycle In-line Heater
310b Recycle Heater
311 First Recycle Heater Valve
312 Second Recycle Heater Valve
313 Third Recycle Heater Valve
400 Heater Valve
410 Additive Heater

The invention claimed is:

1. A method for power generation, the method comprising:

providing a recycle stream comprising $CO_2$;
adding an oxidant to the recycle stream comprising $CO_2$ such that the recycle stream comprising $CO_2$ further includes the oxidant in an amount of about 2% to about 15% by mass based on the total mass of the recycle stream comprising $CO_2$;

injecting the recycle stream comprising $CO_2$ and including the oxidant into a combustion turbine with a fuel to cause combustion of the fuel and formation of a combustion product stream; and generating power by expanding the combustion product stream in the combustion turbine.

2. The method of claim 1, wherein the combustion of the fuel is substantially flameless.

3. The method of claim 1, further comprising heating the recycle stream comprising $CO_2$ and including the oxidant to a temperature in the range of about 400° C. to about 2000° C. prior to injecting into the combustion turbine.

4. The method of claim 3, wherein heating the recycle stream comprising $CO_2$ and including the oxidant comprises passing the recycle stream comprising $CO_2$ and including the oxidant through a recuperative heat exchanger.

5. The method of claim 4, wherein heating comprises utilizing heat withdrawn from the combustion product stream.

6. The method of claim 3, wherein heating the recycle stream comprising $CO_2$ and including the oxidant comprises passing the recycle stream comprising $CO_2$ and including the oxidant through a dedicated heater.

7. The method of claim 6, comprising withdrawing a sidestream from the recycle stream comprising $CO_2$ and including the oxidant and passing only the sidestream through the dedicated heater.

8. The method of claim 1, further comprising treating the combustion product stream exiting the combustion turbine to remove one or more components thereof and form the recycle stream comprising $CO_2$.

9. The method of claim 1, further comprising pressurizing the recycle stream comprising $CO_2$ and including the oxidant using one or both of a pump and compressor to a pressure suitable for input to the combustion turbine.

10. The method of claim 1, wherein the oxidant is added to the recycle stream comprising $CO_2$ at an inlet positioned upstream from a pump and downstream from a compressor.

11. The method of claim 1, wherein the oxidant is added to the recycle stream comprising $CO_2$ at an inlet positioned upstream from a compressor.

12. The method of claim 1, wherein the combustion turbine comprises a combustor having an inlet end and an outlet end spaced apart along a longitudinal axis thereof, the combustor having a combustion chamber positioned between the inlet end and the outlet end.

13. The method of claim 12, comprising injecting the fuel into the combustor substantially only proximate to the inlet end, and injecting the recycle stream comprising $CO_2$ and including the oxidant into the combustor proximate to the inlet end and also into the combustion chamber along at least a portion of a longitudinal axis of the combustion chamber.

14. The method of claim 1, comprising measuring an oxygen content of the recycle stream comprising $CO_2$ to generate an oxidant inlet command that regulates the adding of the oxidant to the recycle stream comprising $CO_2$ at an oxidant inlet so that the concentration of oxygen in the recycle stream comprising $CO_2$ and including the oxidant is maintained within a defined oxygen concentration.

15. The method of claim 14, wherein the defined oxygen concentration is about 4% to about 7% molar based on the total content of the recycle stream comprising $CO_2$ and including the oxidant.

16. The method of claim 14, comprising regulating the adding of the oxidant to the recycle stream comprising $CO_2$ at the oxidant inlet so that the concentration of the oxygen in the recycle stream comprising $CO_2$ and including the oxidant is initially set at a first, higher concentration that promotes flamed combustion and is then set to a second, lower concentration that promotes flameless combustion.

\* \* \* \* \*